(12) United States Patent
Matsushita

(10) Patent No.: US 7,148,646 B2
(45) Date of Patent: Dec. 12, 2006

(54) METHOD FOR CONTROLLING PARALLEL KINEMATIC MECHANISM MACHINE AND CONTROL DEVICE THEREFOR

(75) Inventor: Tetsuya Matsushita, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 97 days.

(21) Appl. No.: 11/008,499

(22) Filed: Dec. 9, 2004

(65) Prior Publication Data
US 2005/0143859 A1    Jun. 30, 2005

(30) Foreign Application Priority Data
Dec. 25, 2003   (JP)   ............................. 2003-430628

(51) Int. Cl.
    *B25J 15/02*    (2006.01)
(52) U.S. Cl. .............. 318/568.21; 318/560; 318/568.1; 318/568.13; 318/568.14; 700/245; 700/247; 700/261; 901/30; 901/31; 901/36
(58) Field of Classification Search ......... 318/560–569
    See application file for complete search history.

(56) References Cited

U.S. PATENT DOCUMENTS

| | | | | |
|---|---|---|---|---|
| 4,756,662 A | * | 7/1988 | Tanie et al. ................. | 414/729 |
| 4,790,718 A | * | 12/1988 | Vickers ....................... | 414/735 |
| 5,049,797 A | * | 9/1991 | Phillips .................. | 318/568.16 |
| 5,179,525 A | * | 1/1993 | Griffis et al. ................... | 703/1 |
| 5,656,905 A | * | 8/1997 | Tsai ....................... | 318/568.21 |
| 5,797,191 A | * | 8/1998 | Ziegert ........................ | 33/503 |
| 6,648,583 B1 | * | 11/2003 | Roy et al. .................... | 414/735 |
| 2004/0135509 A1 | * | 7/2004 | Kwon et al. ................ | 313/584 |
| 2004/0211284 A1 | * | 10/2004 | Roy et al. ................ | 74/490.01 |

* cited by examiner

*Primary Examiner*—Lincoln Donovan
*Assistant Examiner*—Tyrone Smith
(74) *Attorney, Agent, or Firm*—Burr & Brown

(57) ABSTRACT

A method for controlling a parallel kinematic mechanism machine and control device therefor, which includes the steps of (1) obtaining each actuator command based on kinematic parameters; (2) calculating loads exerted by the weight of each component of a machine; (3) obtaining loads in the direction of axis of each actuator; (4) decomposing loads in the direction of axis of each strut into directions of axes of the first and second universal joints; (5) obtaining the amounts of elastic deformation of each element; (6) converting approximately the amounts of elastic deformation of each universal joint to displacement in the direction of axis of each actuator; (7) subtracting displacement in the direction of axis of each actuator obtained at steps (5) and (6) from each actuator command to renew each actuator command, and controlling the machine according to each renewed actuator command.

14 Claims, 9 Drawing Sheets

METHOD FOR CONTROLLING PARALLEL KINEMATIC MECHANISM MACHINE AND CONTROL DEVICE THEREFOR

BACKGROUND OF THE INVENTION

This application claims the benefit of Japanese Patent Application Number 2003-430628 filed Dec. 25, 2003, the entirety of which is incorporated by reference.

1. Technical Field

The present invention relates to a method for controlling a parallel kinematic mechanism machine in which a plurality of struts driven by actuators can move an end effector connected thereto, and a control device whereby to embody this method.

2. Description of the Related Art

A method described in the Japanese Patent publication of unexamined application No. 2002-91568 has been known as a conventional method for controlling a parallel kinematic mechanism machine. This method is such that actuator commands corresponding to the length of each strut are corrected with high accuracy while taking the amount of elastic deformation of each joint into account even when the struts are connected to the end effector with universal joints consisting of a combination of joints having one degree of freedom in rotation. Moreover, this method is such that conversion of inverse kinematics is used to calculate commands for the length of each strut from the position and posture commands of the end effector and from kinematic parameters.

Specifically, the conversion of inverse kinematics is performed without load to obtain uncorrected commands of each actuator. Then angles of each joint are calculated, loads acting on the components of the joints are obtained from loads acting on each strut and others, and the amount of elastic deformation of each component is calculated from the loads obtained. On the basis of the amount, kinematic parameters are corrected. With the use of the corrected parameters the conversion of inverse kinematics is again performed to obtain corrected commands of each actuator.

SUMMARY OF THE INVENTION

The above-mentioned conventional method requires double calculations of the conversion of inverse kinematics as well as calculations of angles of each joint, loads and the amount of elastic deformation for each component, resulting in an enormous computational effort. To prevent degradation in controlling performances caused by the elongation of calculation time, there is no alternative but to use a control device that is excellent in calculation performances, but expensive.

An object of the present invention according to first and fifth aspects, is to embody with a small computational effort the correction of actuator commands in consideration of the amount of elastic deformation of the universal joint in order to determine the position and posture of the end effector with high accuracy.

In order to achieve the above object, the invention according to a first aspect provides a method for controlling a parallel kinematic mechanism machine, wherein the parallel kinematic mechanism machine comprises a base fixed outside, a plurality of struts connected to the base through a first universal joint, an actuator for driving each strut, an end effector connected to each strut through a second universal joint, and a control device for controlling the actuator by giving an actuator command thereto, the method comprising:

a first step of obtaining each actuator command corresponding to position and posture commands of the end effector on the basis of predetermined kinematic parameters in the parallel kinematic mechanism machine;

a second step of obtaining a load exerted by weight of at least any of the struts, actuators, first universal joints, second universal joints, and end effector;

a third step of obtaining a load in the direction of axis of each strut and each actuator from the load obtained at the second step, kinematic parameters, and the position and posture commands of the end effector;

a fourth step of decomposing the loads in the direction of axis of each strut obtained at the third step into each direction of axis of each universal joint defining an axial coordinate that contains the same axis in direction as any of rotation axes of the components of each first universal joint and/or each second universal joint;

a fifth step of obtaining the amount of elastic deformation of at least any of the struts, actuators, or end effector from the loads in the direction of axis of each strut and each actuator obtained at the third step and from compliances of at least any of the strut, actuators, or end effector in each direction, and obtaining each first amount of elastic deformation and/or each second amount of elastic deformation that are amounts of elastic deformation of each first universal joint and/or each second universal joint respectively from compliances in each direction of axis of each universal joint and the loads in the direction of axis of each strut decomposed at the fourth step;

a sixth step of converting each amount of elastic deformation, and each first amount of elastic deformation and/or each second amount of elastic deformation obtained at the fifth step into the direction of axis of each actuator in consideration of angles in the direction of axis of each actuator and each strut; and a seventh step of renewing actuator commands obtained at the first step in consideration of the converted each amount of elastic deformation, and converted each first amount of elastic deformation and/or converted each second amount of elastic deformation obtained respectively at the sixth step.

In order to achieve an object of further improving accuracy without the sacrifice of quickness in addition to the above object, the invention according to a second aspect is related to a method for controlling a parallel kinematic mechanism machine according to the first aspect, wherein, at the second step, loads exerted by weight of at least any of the struts, actuators, or second universal joints are decomposed into loads in the direction of axis of each strut and loads in the direction perpendicular to the axis of the strut, and then obtained loads in the direction perpendicular to the axis of the strut is added to load acting on the end effector as a moment load around a rotation center of each first universal joint.

In order to achieve the object of performing quickly a high accurate correction with attention drawn to elements on which the universal joint is fixed in addition to the above object, the invention according to a third aspect is related to a method for controlling a parallel kinematic mechanism machine according to the first or second aspect, wherein, at the fourth step, the axis of the first universal joint is fixed on the base, and that of the second universal joint is fixed on the end effector.

In order to achieve the object of converting quickly and accurately displacement in various directions due to elastic deformation exerting the universal joint to actuator commands in addition to the above object, the invention according to a fourth aspect is related to a method for controlling a parallel kinematic mechanism machine according to any of the first through third aspects, wherein, at the sixth step, each first amount of elastic deformation and/or each second amount of elastic deformation is/are approximated to the direction of axis of each actuator on the basis of the positional relationship between vector of each first amount of elastic deformation and/or vector of each second amount of elastic deformation along the direction of deformation of each first amount of elastic deformation and/or each second amount of elastic deformation and vector of axis of each actuator along the axis of each actuator.

In order to achieve the above object, the invention according to a fifth aspect includes a control device for controlling a parallel kinematic mechanism machine by providing actuator commands therewith, wherein the parallel kinematic mechanism machine comprises a base fixed outside, a plurality of struts connected to the base through a first universal joint, actuators for driving each strut, an end effector connected to each strut through a second universal joint, the control device comprising:

an actuator command computing section for obtaining each actuator command corresponding to position and posture commands of the end effector on the basis of predetermined kinematic parameters in the parallel kinematic mechanism machine;

a load computing section for obtaining a load exerted by weight of at least any of the struts, actuators, first universal joints, second universal joints, and end effector;

an axial load computing section for obtaining loads in the direction of axis of each strut and each actuator from the load obtained with the load computing section, kinematic parameters, and the position and posture commands of the end effector;

a decomposing computing section for decomposing the loads in the direction of axis of each strut obtained with the axial load computing section into each direction of axis of each universal joint defining an axial coordinate that contains the same axis in direction as any of rotation axes of the components of each first universal joint and/or each second universal joint;

an elastic deformation-amount computing section for obtaining the amount of elastic deformation of at least any of the struts, actuators, or end effector from the loads in the direction of axis of each strut and each actuator obtained with the axial load computing section, and from compliances of at least any of the strut, actuators, or end effector in each direction, and obtaining each first amount of elastic deformation and/or each second amount of elastic deformation that are amounts of elastic deformation of each first universal joint and/or each second universal joint respectively from compliances in each direction of axis of each universal joint and the loads in the direction of axis of each strut decomposed at the decomposing computing section;

a conversion computing section for converting each amount of elastic deformation, and each first amount of elastic deformation and/or each second amount of elastic deformation obtained with the elastic deformation-amount computing section into the direction of axis of each actuator in consideration of angles in the direction of axis of each actuator and each strut; and a renewal computing section for renewing actuator commands obtained with the actuator command computing section in consideration of the converted each amount of elastic deformation, and converted each first amount of elastic deformation and/or converted each second amount of elastic deformation obtained respectively at the conversion computing section.

In order to achieve the object of further improving accuracy without the sacrifice of quickness in addition to the above object, the invention according to a six aspect includes a control device for controlling a parallel kinematic mechanism machine according to the fifth apect, wherein, at the load computing section, loads exerted by weight of at least any of the struts, actuators, or second universal joints are decomposed into loads in the direction of axis of each strut and loads in the direction perpendicular to the axis of the strut, and then obtained loads in the direction perpendicular to the axis of the strut is added to load acting on the end effector as a moment load around a rotation center of each first universal joint.

In order to achieve the object of performing quickly a high accurate correction with attention drawn to elements on which the universal joint is fixed in addition to the above object, the invention according to a seventh aspect includes a control device for controlling a parallel kinematic mechanism machine according to the fifth or sixth aspect, wherein, at the decomposing computing section, the axis of the first universal joint is fixed on the base, and that of the second universal joint is fixed on the end effector.

In order to achieve the object of converting quickly and accurately displacement in various directions due to elastic deformation exerting the universal joint to actuator commands in addition to the above purpose, the invention according to an eighth aspect includes a control device for controlling a parallel kinematic mechanism machine according to any of the fifth through seventh aspects, wherein, at the conversion computing section, each first amount of elastic deformation and/or each second amount of elastic deformation is/are approximated to the direction of axis of each actuator on the basis of the positional relationship between vector of each first amount of elastic deformation and/or vector of each second amount of elastic deformation along the direction of deformation of each first amount of elastic deformation and/or each second amount of elastic deformation and vector of axis of each actuator along the axis of each actuator.

According to the present invention, it has an effect of practicing high accurate correction of actuator commands taken into consideration the amount of elastic deformation of the universal joint with a small and quick computation even in a control device having a general processing capability.

DETAILED DESCRIPTION OF THE PREFERRED EMBODIMENTS

The parallel kinematic mechanism machine related to the preferred embodiment of the present invention will be described by reference of the accompanying drawings.

Figure 1:
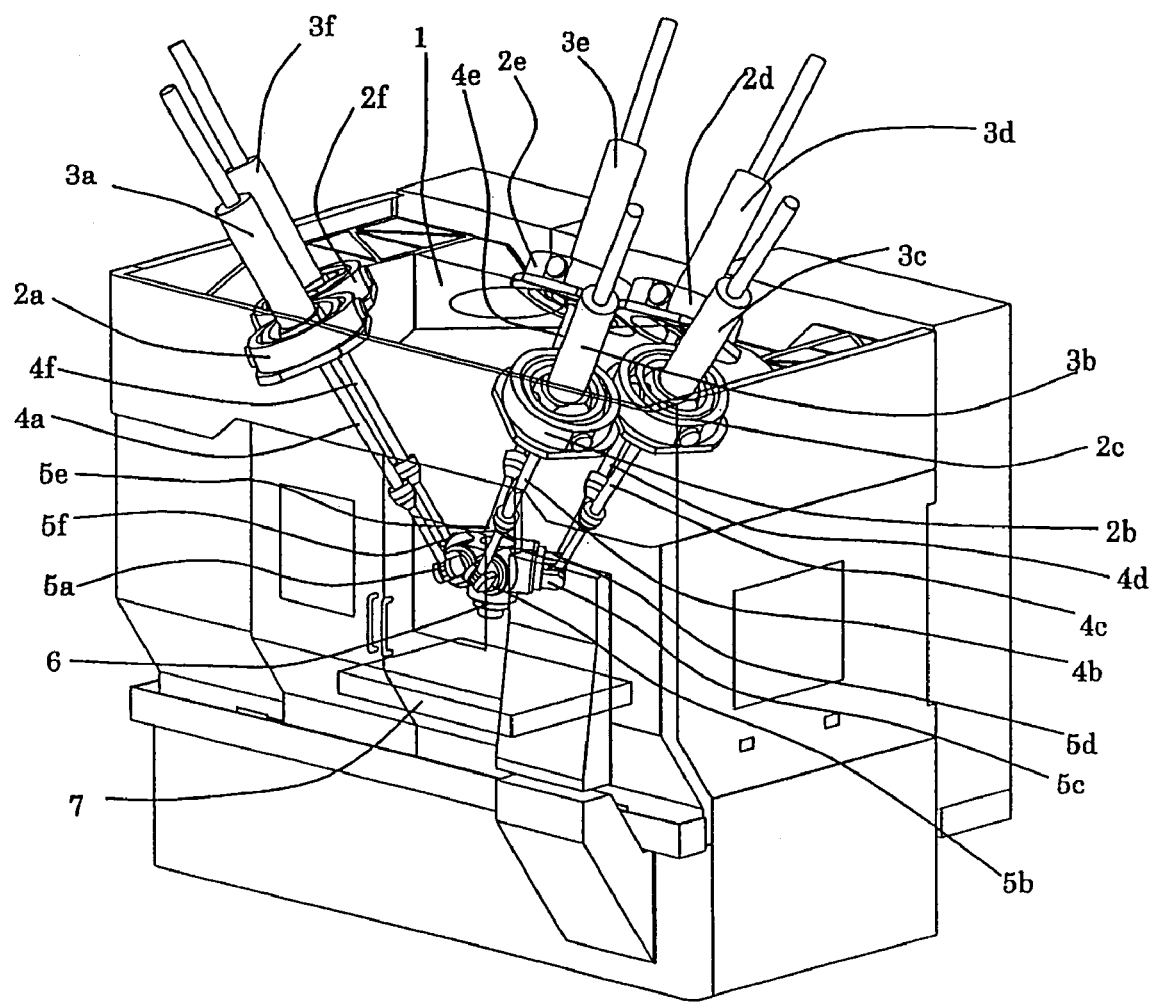
FIG. 1 is a partially perspective diagram of a parallel kinematic mechanism machine controlled by the controlling method according to the present invention.
Figure 2:
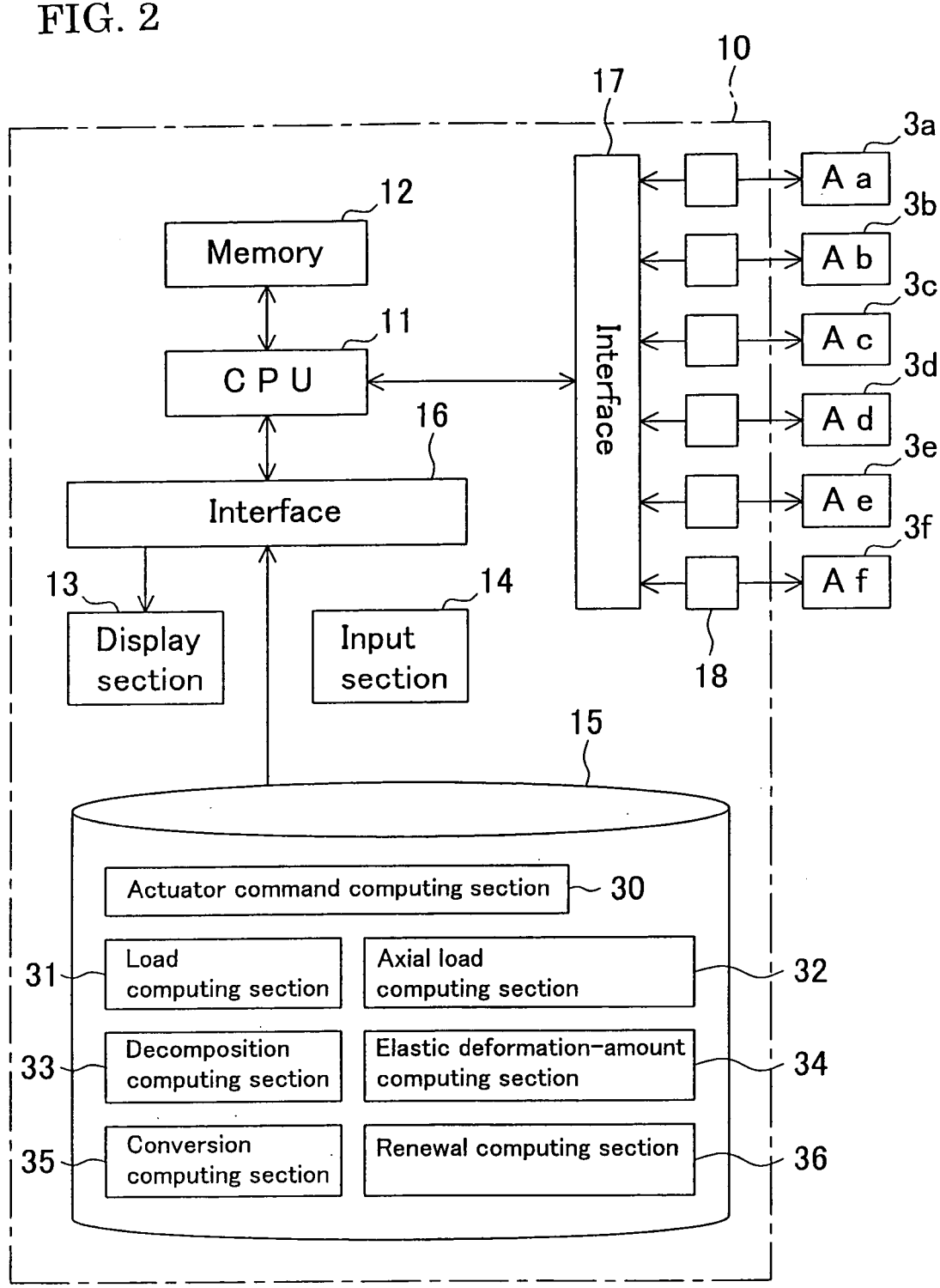
FIG. 2 is a block diagram of a control device related to the present invention.

FIG. 1 is an explanatory drawing of a Stewart-platform parallel kinematic mechanism machine 1 with six degrees of freedom. FIG. 2 is a block diagram of a control device 10 of the parallel kinematic mechanism machine 1. The parallel kinematic mechanism machine 1 comprises a frame 1 acting as a base fixed on a floor, six first universal joints 2a to 2f attached to the frame 1, servomotors 3a to 3f acting as actuators connected to first universal joints 2a to 2f respectively, ball screws 4a to 4f acting as struts driven respectively by servomotors 3a to 3f, second universal joints 5a to 5f connected to the lower ends of ball screws 4a to 4f respectively, one end effector 6 having second universal joints 5a to 5f, a table 7 fixed on the frame 1 on the opposite side of the end effector 6, and a control device 10 electrically connected to servomotors 3a to 3f for providing actuator commands.

As mentioned above, the parallel kinematic mechanism machine 1 has a mechanism consisting of the first universal joint 2a, a servomotor 3a, a ball screw 4a, and the second universal joint 5a, i.e., it has six sets of the same mechanism in all. Hereinafter a representative example without references a to f is used for explanation if it has the same mechanism in each set.

The servomotor 3 is provided with an encoder to output numerical values corresponding to a rotation angle or number of revolutions with respect to a reference state. End effector 6 has a cutter holder and cutter rotational mechanism at its lower part. Table 7 has a mechanism on which works are held.

Figure 3:
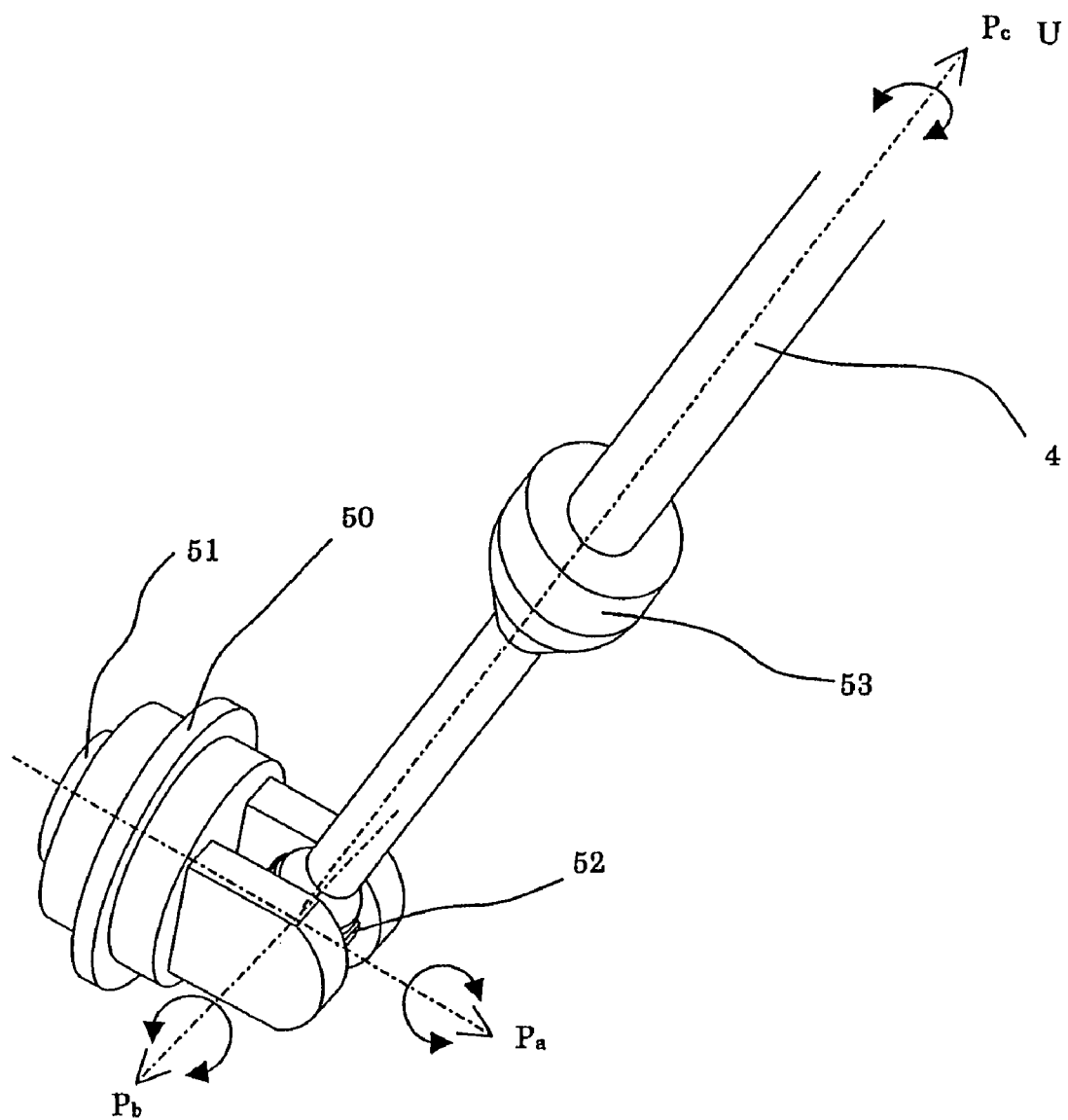
FIG. 3 is a perspective view of a second universal joint in FIG. 1.

As shown in FIG. 3, the second universal joint 5 includes a flange 50 and shafts 51 and 52, and a rod 53 each being a joint with one degree of freedom in rotation. A flange 50 is held vertically on the side that is at right angle to the bottom face of the end effector 6. The shaft 51 is attached to the flange 50 through a bearing, and rotates around an axis of rotation Pa perpendicular to the side of the end effector 6. The shaft 52 is fixed to the shaft 51 through a bearing, and rotates around an axis of rotation Pb. The rod 53 is fixed to the shaft 52, and includes a bearing rotating around an axis of rotation Pc therein, the bearing being connected to a ball screw 4. Axes of rotation Pa to Pc are at right angles to each other. The second universal joint 5 with three degrees of freedom consists of the combination of the three joints.

Figure 4:
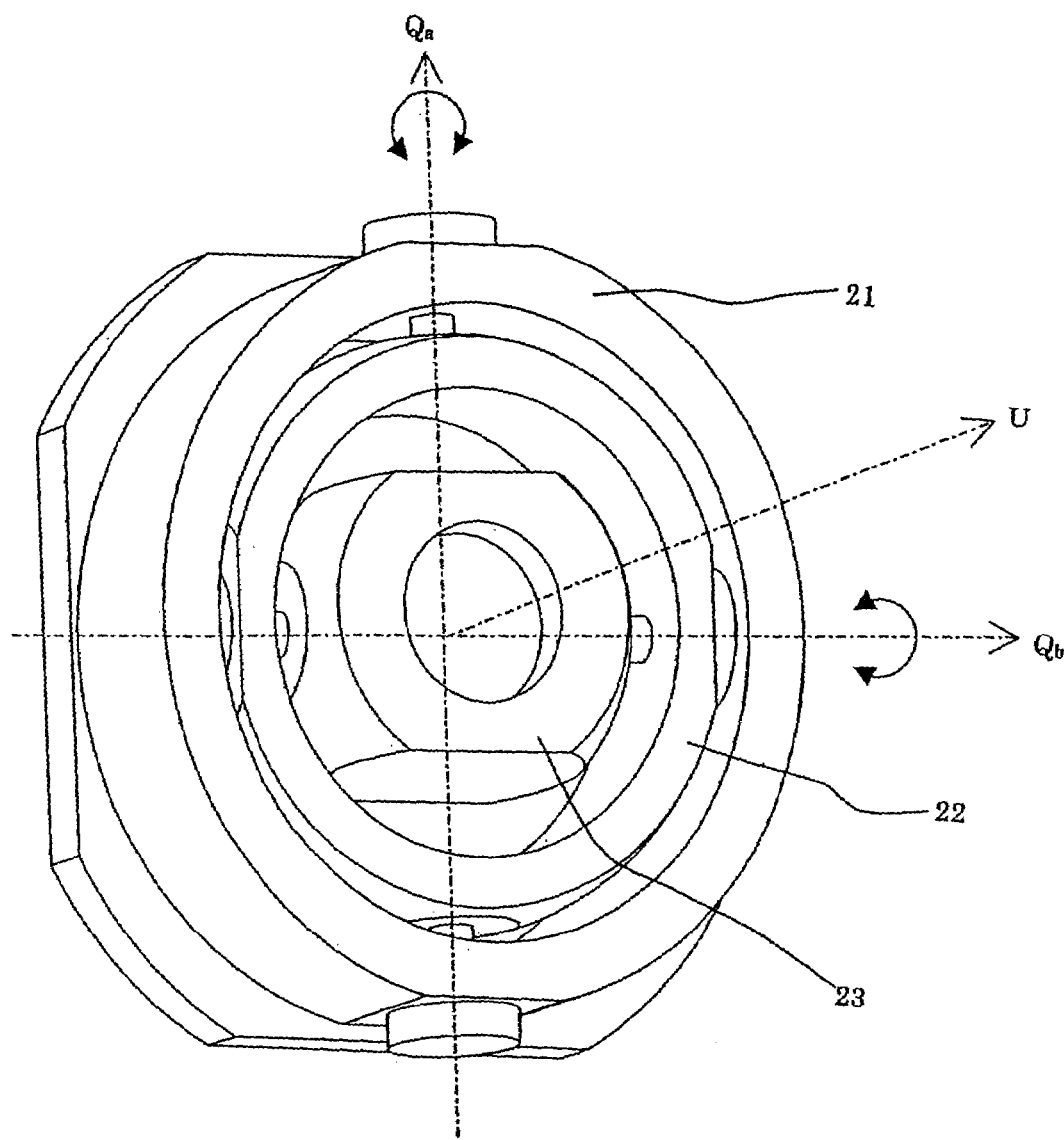
FIG. 4 is a perspective view of a first universal joint in FIG. 1.

As shown in FIG. 4, the first universal joint 2 has a gimbal structure including rings 21, 22 and 23 each being a joint having one digree of freedom in rotation. A ring 21 is fixed to the frame 1 and includes a bearing for supporting a radial axis therein. A ring 22 having this axis is fixed to the ring 21 through the bearing to rotate around an axis of rotation Qa. Similarly, a ring 23 is fixed to the ring 22 with the axis being at right angle to the axis of the ring 22, and rotates around an axis of rotation Qb. Axes of rotation Qa and Qb are at right angles to each other. A combination of two joints forms the first universal joint 2 having two degrees of freedom.

The control device 10 comprises a CPU 11, a memory 12 for temporarily storing steps of programs and others which the CPU 11 executes for control, a display section 13 for displaying various information, an input section 14 for receiving various inputs, a memory means 15 for storing programs, an interface 16 between the reference numerals 13 to 15 and the CPU 11, an interface 17 between an actuator 3 and the CPU 11, and a drive unit 18 for each actuator 3. The memory means 15 stores an actuator commands computing section 30, a load computing section 31, an axial load computing section 32, a decomposition computing section 33, an elastic deformation amount computing section 34, a conversion computing section 35 and a renewal computing section 36, in part of programs.

Figure 5:
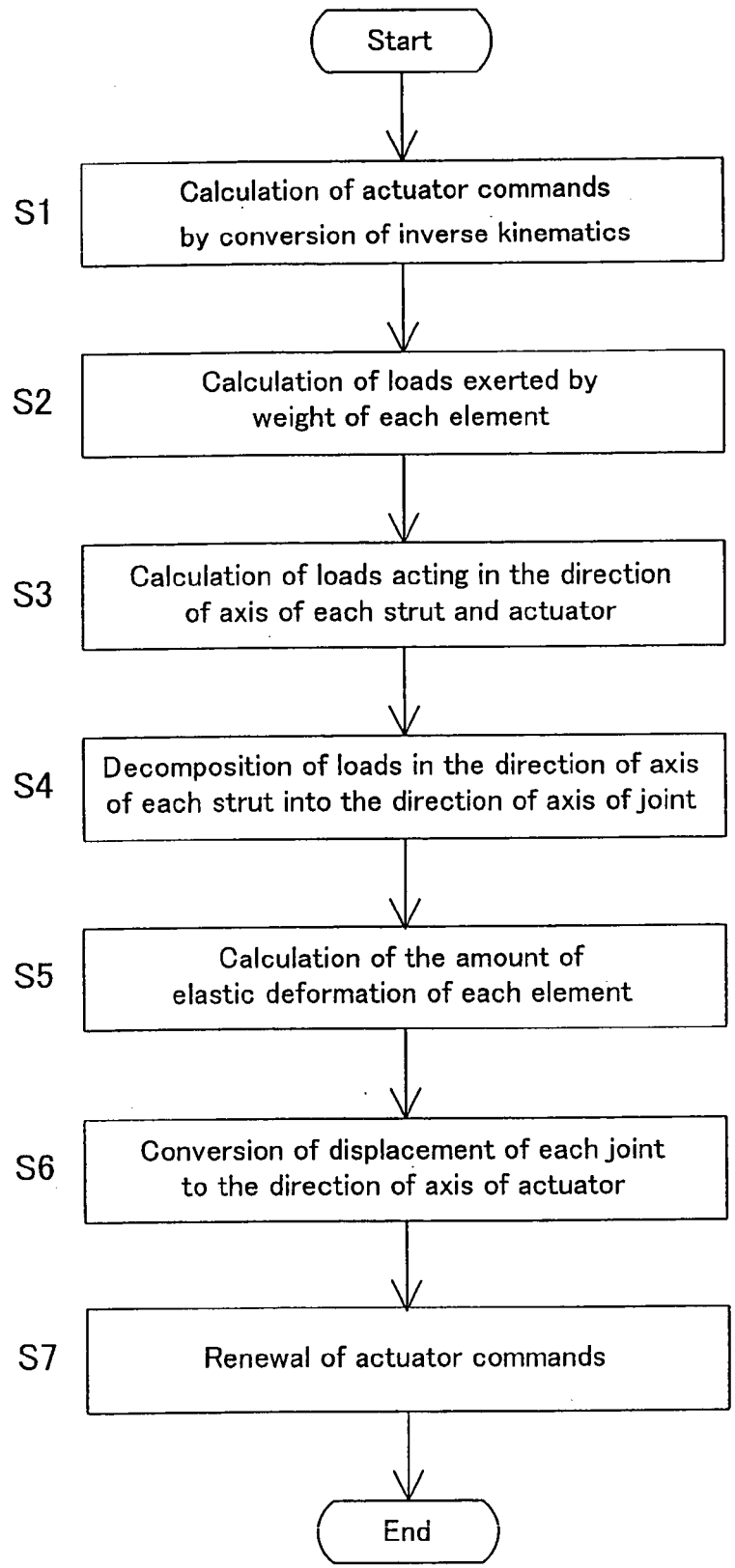
FIG. 5 is a flow chart of an embodiment related to a controlling method according to the present invention.

FIG. 5 shows a flow chart related to a controlling method to be practiced by the control device 10 of the parallel kinematic mechanism machine 1 constituted by the above description. In step S1 as the first step, the actuator commands computing section 30 of the control device 10 converts the given position and posture commands of the end effector 6 to actuator commands by the conversion of inverse kinematics. Where, a strut length of the parallel kinematic mechanism machine 1 is a distance between the rotation centers of the first and second universal joints 2 and 5. In the parallel kinematic mechanism machine 1, actuator commands are similar to encoder outputs. The direction of axis of the actuator is the same as that of axis of the strut. A sturt length of the ball screw 4 is increased and decreased in proportion to a rotation angle and number of revolutions (i.e., actuator commands) of the servomotor 3. Since the actuator commands and strut length commands are completely proportional on a basis of strut length (strut reference length) at a reference position of an encoder, strut length commands may be regarded as actuator commands for use with calculation.

Kinematic parameters used in the parallel kinematic mechanism machine 1 include a rotation center coordinate $Q_i$ of the first universal joint 2, a rotation center coordinate $R_i$ of the second universal joint 5 in the coordinate system relating to the end effector 6, and strut reference length $l_{Bi}$. Where, i varies from 1 to 6, and corresponds to members relating to symbols a to f respectively, and hereinafter the same shall apply. The control device 10 obtains a strut length command $l_i$ from command T (x, y, z, a, b, c) being a combination of position commands (x, y, z) and posture commands (a, b, c) of the end effector 6 by the equation 1 given below. Where, E is a matrix formed by synthesizing parallel and rotational displacements related to T.

$$l_i = |Q_i - E^T(R_i)| \qquad \text{[Equation 1]}$$

Figure 6:
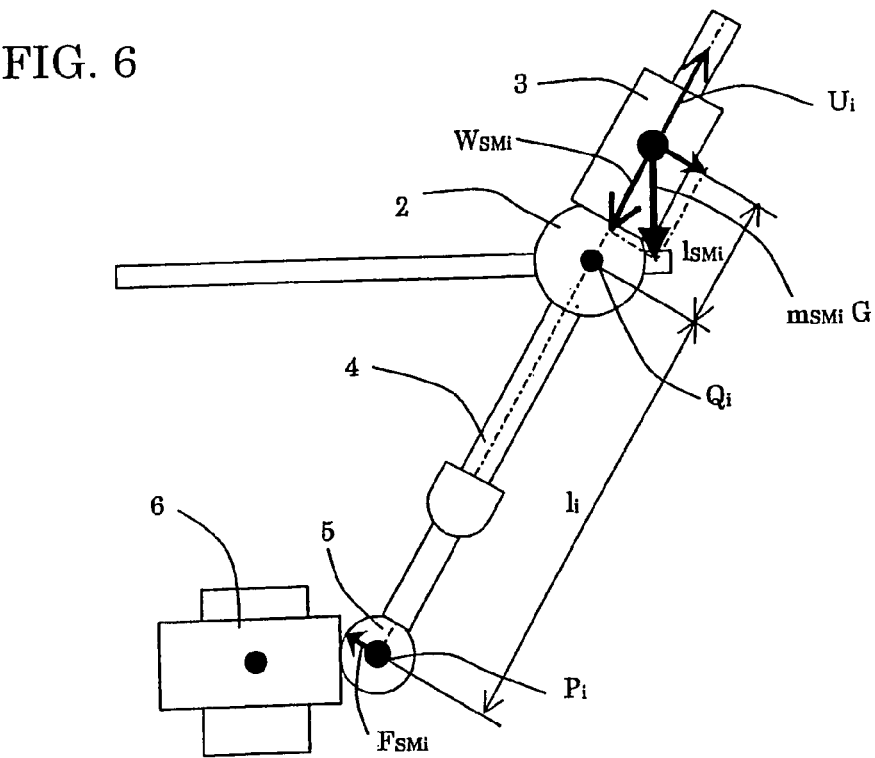
FIG. 6 is an explanatory drawing of load exerted by weight of a servomotor in FIG. 1.

In step S2 as the second step, the load computing section 31 of the control device 10 computes a load exerted by weight of each element of the parallel kinematic mechanism machine 1. Assuming that the servomotor 3 has its own weight $m_{SMi}$, as shown in FIG. 6, it generates a moment load around a rotation center of the first universal joint 2, acting on the end effector 6 as load $F_{SMi}$. Load $F_{SMi}$ is represented below by Equation 2. Where, G is a vector (0, 0, −g), g being acceleration of gravity, $l_{SMi}$ being a distance between a rotation center of the first universal joint 2 and center of gravity of servomotor 3, $l_i$ being strut length command, and $U_i$ being an axial unit vector of (the direction of axis of the strut) of the ball screw 4.

$$F_{SMi} = \frac{l_{SMi} m_{SMi}}{l_i} \{(G \cdot U_i) \cdot U_i + G\} \qquad \text{[Equation 2]}$$

Figure 7:
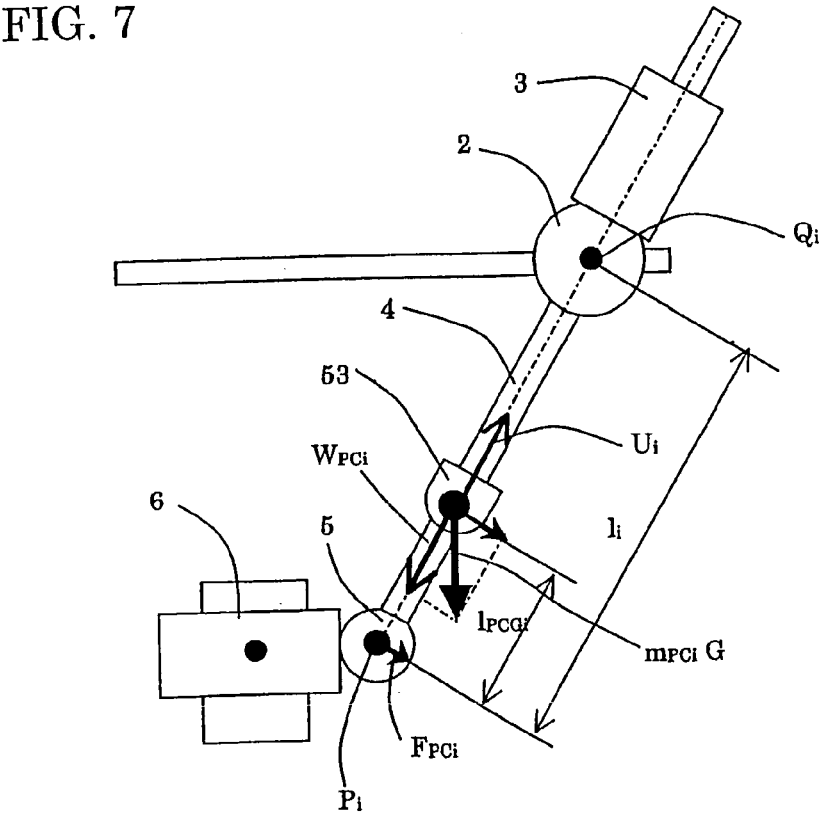
FIG. 7 is an explanatory drawing of load exerted by weight of a rod in FIG. 1.

The bearing housing of the rod 53 of the second universal joint 5 is so large that effect of its own weight $m_{PCi}$ cannot be neglected. As shown in FIG. 7, the weight of the rod generates a moment load around a rotation center of the first universal joint 2, acting on the end effector 6 as load $F_{PCi}$. Load $F_{PCi}$ is represented below by Equation 3. Where, $l_{PCG}$ is a distance between a rotation center of the second universal joint 5 and center of gravity of the rod 53.

$$F_{PCi} = m_{PCi}\left(1 - \frac{l_{PCG}}{l_i}\right)\{(G \cdot U_i) \cdot U_i + G\} \qquad \text{[Equation 3]}$$

Load $W_{PCi}$ exerted by rod 53's own weight $m_{PCi}$ to the direction of axis of the strut is represented by the following Equation 4.

$$W_{PCi} = m_{PCi} G \cdot U_i \qquad \text{[Equation 4]}$$

Figure 8:
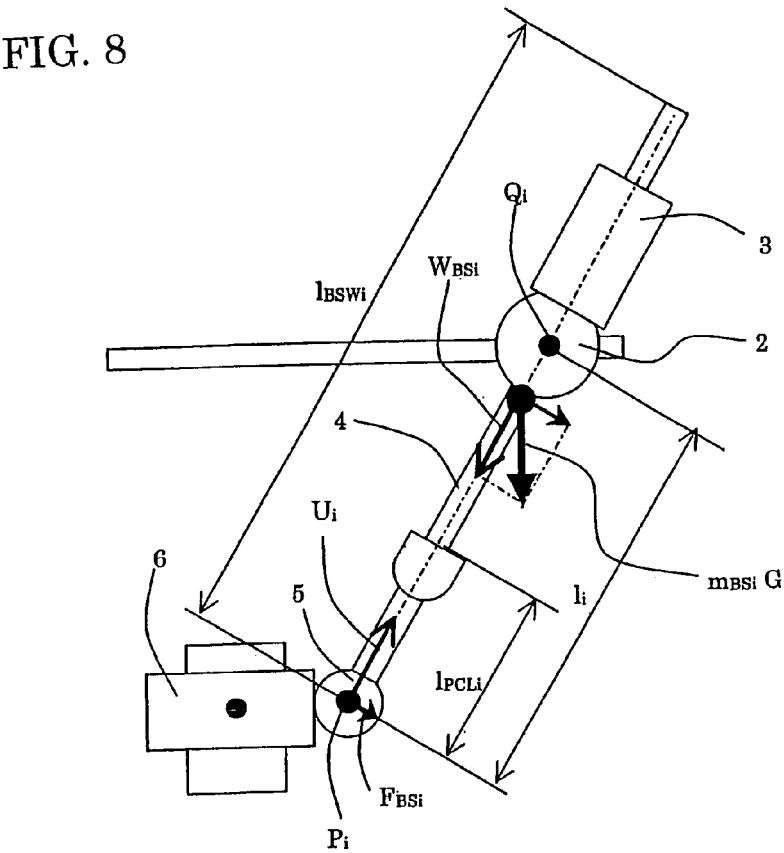
FIG. 8 is an explanatory drawing of load exerted by weight of a ball screw in FIG. 1.

As shown in FIG. 8, ball screw 4's own weight $m_{BSi}$ generates a moment load around a rotation center of the first universal joint 2, acting on the end effector 6 as load $F_{BSi}$. Load $F_{BSi}$ is represented below by Equation 5. Where, $l_{BSWi}$ is the total length of the ball screw 4, and $l_{PCLi}$ is a distance between the second universal joint 5 and a connection of the rod and the ball screw 4.

$$F_{BSi} = m_{BSi}\left(1 - \frac{l_{BSWi} + 2l_{PCLi}}{2l_i}\right)\{(G \cdot U_l) \cdot U_l + G\} \qquad \text{[Equation 5]}$$

Load $W_{BSi}$ exerted by ball screw 4's own weight $m_{BSi}$ to the direction of axis of the strut is represented by the following Equation 6.

$$W_{BSi} = m_{BSi} G \cdot U_i \qquad \text{[Equation 6]}$$

In step S3 as the third step, the axial load computing section 32 of the control device 10 calculates loads of the ball screw 4 and the servomotor 3 acting to the direction of axis of the strut. The end effector 6 is subject to gravity, external force, as well as loads obtained by step S2. Load $F_{xyz}$, obtained by summing the above forces up and both load $F_{xyz}$, and moment load $N_{abc}$, act on center of gravity of end effector 6. Where, load vector F being a combination of load $F_{xyz}$, and moment load $N_{abc}$ is represented below by Equation 7.

$$F = [F_{xyz}, N_{abc}]^T \qquad \text{[Equation 7]}$$

There is a relationship represented below by Equation 8 between a 6 row×6 column Jacobian matrix J determined from kinematic parameters in the parallel kinematic mechanism machine 1 as well as the position and posture commands of the end effector 6 by a known method, load vector W consisting of loads $W_i$ to the direction of axis of each strut and the aforementioned load vector F. Obtaining inverse matrix $J^{-1}$ of Jacobian matrix J produces the following Equation 9, thereby load vector W and load $W_i$ to the direction of axis of each strut can be obtained. Load vector W is represented by the following Equation 10.

$$F = J \cdot W \qquad \text{[Equation 8]}$$

$$W = J^{-1} \cdot F \qquad \text{[Equation 9]}$$

$$W = [w_1, w_2, w_3, w_4, w_5, w_6]^T \qquad \text{[Equation 10]}$$

Figure 10:
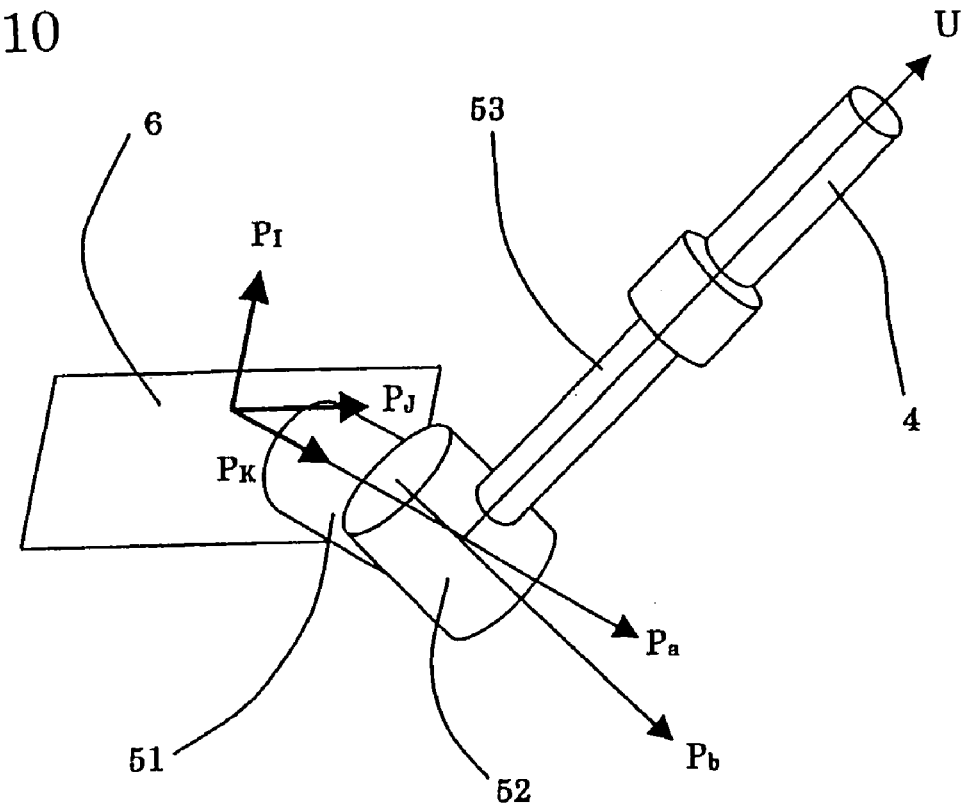
FIG. 10 is an explanatory drawing of rotation axis and the axis of the universal joint related to the second universal joint in FIG. 1.

In step S4 of the fourth step, the elastic deformation amount computing section 34 of the control device 10 decomposes loads in the direction of axis of the strut obtained by the above Equations into the direction of axis of each joint in both universal joints 2 and 5, i.e., the direction of axis of the universal joint. FIG. 10 is a model of the second universal joint 5. Axes $P_I$, $P_J$, and $P_K$ of universal joint fixed on the end effector 6 are defined separately from rotation axes $P_a$ to $P_c$. Axes of universal joint $P_I$ to $P_K$ define a rectangular coordinate system where they are at right angles to each other at the same orthogonal point. The orthogonal point is the same as those of rotation axes $P_a$ to $P_c$, however they are displaced in the figure for clear understanding. Rotation axis $P_a$ and the axis of the universal joint $P_K$ are oriented to the same direction, the axis of the universal joint $P_J$ is made parallel to the bottom of end effector 6, and the axis of the universal joint $P_I$ is made perpendicular to the bottom of end effector 6.

The obtained load in the direction of axis of each strut acts on the second universal joint 5. The control device 10 decomposes the loads into respective directions of axes $P_I$ to $P_K$ of the second universal joint 5 fixed on the end effector 6. This decomposition is carried out by the following Equation 11. Where, $W_{PIi}$, $W_{PJi}$, and $W_{PKi}$ are loads decomposed into the directions $P_I$, $P_J$, and $P_K$ respectively. $P_{Ii}$, $P_{Ji}$, and $P_{Ki}$ are unit vectors of the axes of universal joint $P_I$, $P_J$, and $P_K$ respectively. Axes of universal joint $P_I$, $P_J$, and $P_K$ vary with the position and posture of the end effector 6, and differ with angles at which the second universal joint 5 is fixed on end effector 6.

$$\begin{cases} w_{PIi} = w_i(U_i \cdot P_{Ii}) \\ w_{PJi} = w_i(U_i \cdot P_{Ji}) \\ w_{PKi} = w_i(U_i \cdot P_{Ki}) \end{cases} \qquad \text{[Equation 11]}$$

For the first universal joint 2, as is the case with the second universal joint 5, loads in the direction of axis of each strut can be decomposed into the directions of axis of each universal joint. An axis used as the axis of the universal joint shall be fixed on frame 1 to which the first universal joint 2 is attached. Load $W_i'$ weighing on the first universal joint 2 is represented by Equation 12.

$$w_i' = w_i + w_{PCi} + w_{BSi} \qquad \text{[Equation 12]}$$

Figure 9:
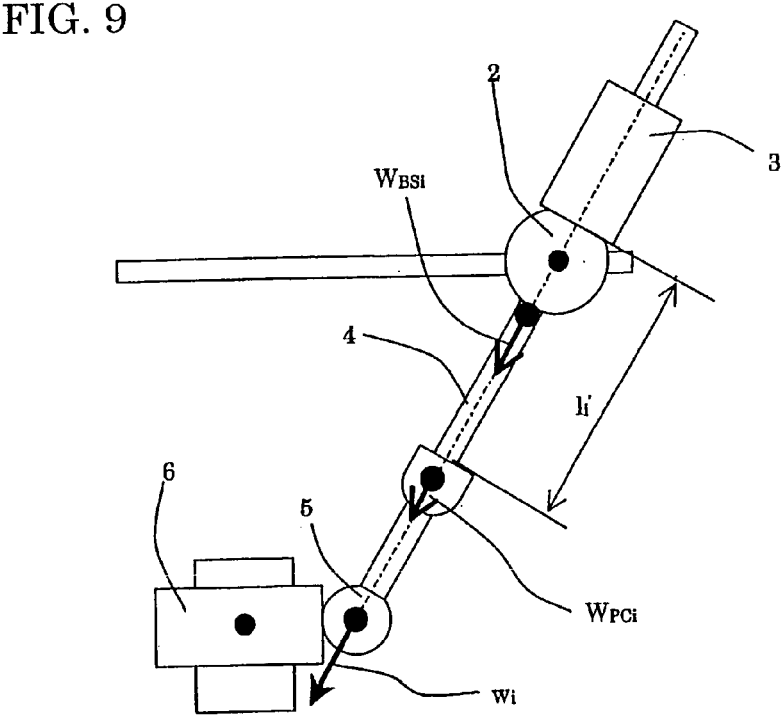
FIG. 9 is an explanatory drawing of load in the direction of axis of the ball screw in FIG. 1.

In step S5 as the fifth step, the elastic deformation amount computing section 34 of the control device 10 calculates the amount of elastic deformation of each element in the parallel kinematic mechanism machine 1. The control device 10 estimates the amount of elastic deformation of each element in the direction of axis of each strut (the direction of axis of the actuator). Each element in the direction of axis of each strut is subjected to loads $W_{BSi}$ and $W_{PCi}$ obtained by step S2, and load $W_i$ in the direction of axis of each strut obtained by step S3. As shown in FIG. 9, the control device 10 takes into account the fact that loads are different with where each element is. Then, the amount of elastic deformation $\Delta l_i$ in the direction of axis of each strut as the third amount of elastic deformation can be obtained from compliance of each element in the direction of axis of the strut and the loads by the following Equation 13. Where, $l_i'$ is a length occupied by the ball screw 4 out of a strut length determined by the position and posture commands of the end effector 6. $C_{LOi}$, $C_{LAi}$, and $C_{LBi}$ are, respectively, a compliance of members for the ball screw 4, and a compliance converted from the ball screw 4's own strain exerted by weight of the ball screw, which are different according to a strut length. $C_{MOi}$, $C_{MAi}$, and $C_{MBi}$ are, respectively, compliances of the flange 52, the rod 53, various bearings, a nut 22 and a ring 23 of the ball screw 4 (partly omitted), which are independent of a strut length.

$$\Delta l_i = (c_{LOi}l'_i + c_{MOi})w_i + (c_{LAi}l'_i + c_{MAi})w_{PCi} + (c_{LBi}l'_i + c_{MBi})w_{BSi}$$ [Equation 13]

The control device 10 estimates the amount of elastic deformation of the second universal joint 5. In general, compliances of each element of the second universal joint 5 are separated into an axial direction of each bearing in the elements and a radial direction perpendicular to the axial direction. As shown in FIG. 10, for the axes of the universal joint $P_I$ to $P_K$, an axial direction of the bearing related to the shaft 51 is the direction of axis of the universal joint $P_K$, and a radial direction is the direction composed by the axes of the universal joint $P_I$ and $P_J$. With respect to bearings related to the shafts 52 and the rod 53, there is no need to consider a load in the direction of axis of the strut, or they act only in the direction of axis of the strut. For this reason, loads in the direction of axis of the strut are not decomposed to calculate the amount of elastic deformation and the first and the second universal joint (the first and the second amount of elastic deformation).

Compliances of each bearing decomposed into the direction of the axes of the universal joint $P_I$ to $P_K$ can be easily obtained from a predetermined compliance. The amount of elastic deformation of the second universal joint 5 can also be obtained from the compliances decomposed into the directions of the axes $P_I$ to $P_K$ of the universal joint and loads in the directions of axes of the universal joint $P_I$ to $P_K$ obtained by step S4. The second universal joint 5 is, however, influenced by deformation of end effector 6 due to load acting on the second universal joint 5 because it is fixed on the end effector 6, so that this influence needs to be taken into account by linear approximation. Thus, the amount of elastic deformation $\Delta Pi$ of the second universal joint 5 is estimated as the second amount of elastic deformation by the following Equation 14. Where, $C_{PIi}$, $C_{PJi}$, and $C_{PKi}$ are compliances in the directions of axes of the universal joint $P_I$, $P_J$, and $P_K$ respectively, j means an axial number next to i-th ball screw 4 (strut), and $K_{Pj}$ is an adjacent influence coefficient as proportional constant.

$$\Delta P_i = (c_{PIi}w_{PIi})P_{Ii} + (c_{PJi}w_{PJi})P_{Ji} + (c_{PKi}w_{PKi} + k_{Pj}c_{PKj}w_{PKj})P_{Ki}$$ [Equation 14]

The amount of elastic deformation of the first universal joint 2 as the first amount of elastic deformation can be obtained as is the case with the second universal joint 5. It is the frame 1 that affects neighbors. That is, the load acting on one of the first universal joints 2 affects a place where the adjacent first universal joint 2 is fixed on the frame 1 and deforms the adjacent first universal joint. At this point the adjacent first universal joint is influenced in the direction of axis of the universal joint $Q_K$ out of the axes of the universal joint $Q_I$ to $Q_k$ fixed on the frame 1, and other directions can be neglected. Consequently an adjacent influence coefficient is applied only to the direction of axis of the universal joint $Q_K$ in Equation 14.

Figure 11:
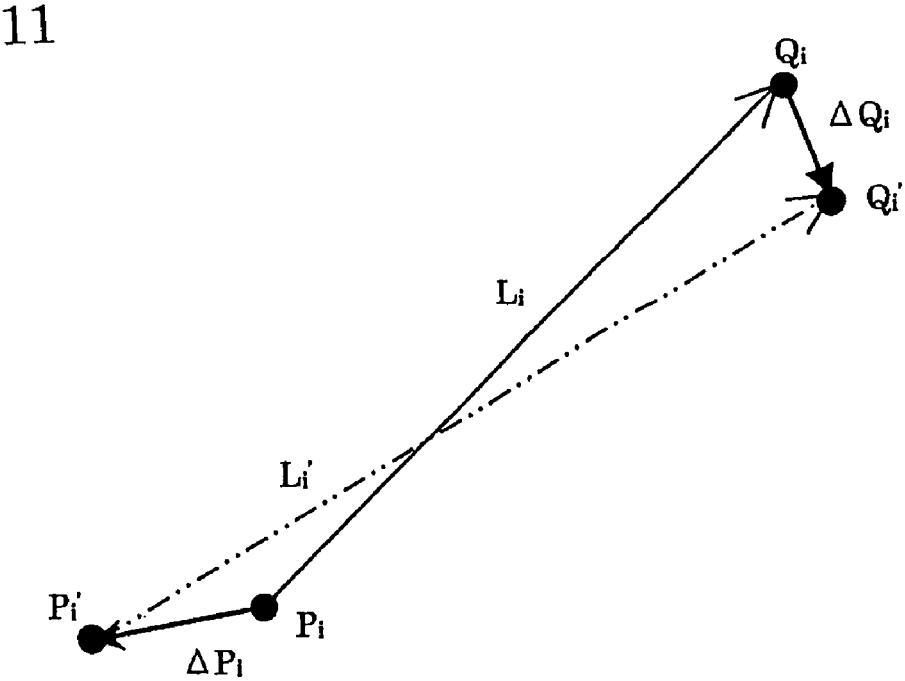
FIG. 11 is an explanatory drawing of relationship between displacement in rotation center related to the first and second universal joints in FIG. 1 and vector of axis of the strut.

In step S6 as the sixth step, the conversion computing section 35 of the control device 10 converts a displacement caused by elastic deformation of both universal joints into the direction of axis of the actuator. In other words, it translates the elastic deformation of the first and second universal joints 2 and 5 obtained by step S5 as a shift of center of rotation of the universal joints 2 and 5. FIG. 11 illustrates a relationship of vectors $\Delta P_i$ and $\Delta Q_i$ of displacement of center of rotation of the first and second universal joints 2 and 5 to vector $L_i$ of axis of the strut. Where, $Q_i$ and $P_i$ are centers of rotation of first and second universal joints before elastic deformation respectively, $Q_i'$ and $P_i'$ are centers of rotation of the first and second universal joints after elastic deformation respectively, and $L_i$ is a vector of axis of the strut after elastic deformation. Thus, the relationship between a vector of displacement of center of rotation of each universal joint and a vector of axis of the strut can be expressed by the following Equation 15.

$$L_i' = L_i + \Delta P_i - \Delta Q_i$$ [Equation 15]

The displacement of both universal joints 2 and 5 is small so that it can be approximated to displacement of length of axis of the strut. That is, from the viewpoint of approximation of directional components of axis of the strut in the displacement vectors of center of rotation $\Delta P_i$ and $\Delta Q_i$ to a length displacement of axis of the strut $\Delta l_{Ji}$, a displacement of the universal joints 2 and 5 can be converted to a length displacement of axis of the strut $\Delta l_{Ji}$ by the following Equation 16. Since an axial direction of the strut (that of the ball screw 4) in the parallel kinematic mechanism machine 1 is directed to the same axial direction of actuator (that of the servomotor 3), a length displacement of axis of the strut $l_{Ji}$ can be regarded as a displacement converted to axial direction of actuator.

$$\Delta l_{Ji} = U_i \cdot (\Delta P_i - \Delta Q_i)$$ [Equation 16]

In step S7 as the seventh step, the renewal computing section 36 of the control device 10 renews actuator commands. As shown in Equation 17, strut length commands, that is, actuator commands, are corrected by subtracting a length displacement of the strut $\Delta l_i$ (the third amount of elastic deformation) obtained at step S5 and a length displacement of axis of the strut $\Delta l_{Ji}$ (the first and second amount of elastic deformation) obtained at step S6 therefrom.

$$l_i \leftarrow l_i - \Delta l_i - \Delta l_{Ji}$$ [Equation 17]

Controlling the servomotor 3 according to these corrected actuator commands offsets the amount of elastic deformation of an actual machine. In other words, offset of the amounts of elastic deformation related to the strut and the universal joint can only be made by providing initial actuator commands with corrected values. This enables the end effector to be located in the exact position and posture according to the position and posture commands of the end effector 6 with a small computational effort.

Figure 12:
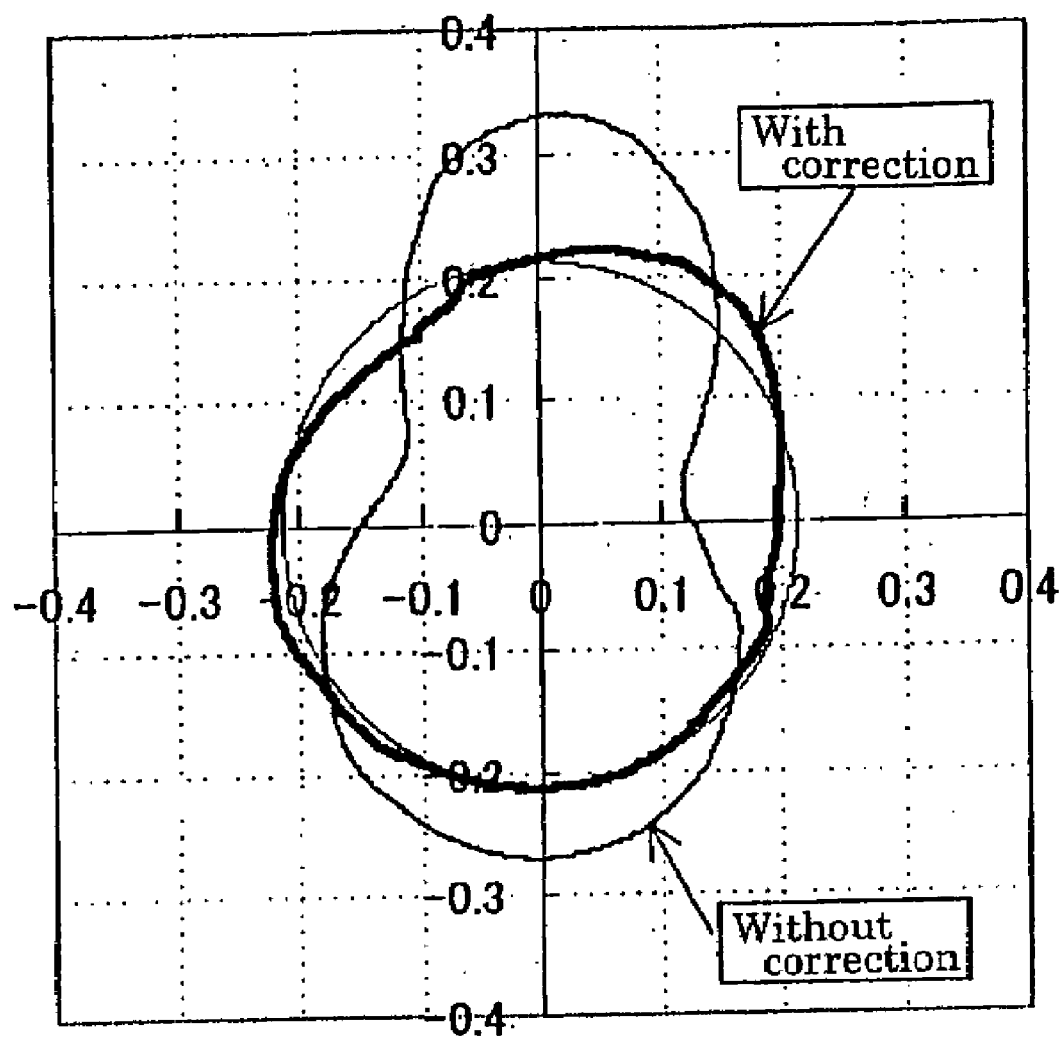
FIG. 12 is an explanatory drawing of measurements on circularity by DBB method with the present invention applied or not applied to the parallel kinematic mechanism machine in FIG. 1.

FIG. 12 shows measurements on circularity of arc trajectory by Double Ball Bar (DBB) method with use of the parallel kinematic mechanism machine 1. A thick line is a trajectory by the controlling method according to the present invention, and a thin line shows one without any controlling method for correction. It can be confirmed from this figure that circularity has been significantly improved.

The present invention can also be used for such a parallel kinematic mechanism machine that the axis of a strut is not parallel to the axis of an actuator. In that case, a load acting in the direction of axis of the actuator is calculated at step S3 described above, and axial components of the strut are obtained. Then, loads taking into account the axial components of the strut at step S4 are decomposed into each direction based upon elements of universal joint, and at step S6 the amount of displacement of the actuator corresponding to that of the strut caused by the universal joint can be obtained.

With regard to the axis of the universal joint, if the axes of universal joints $P_i$ to $P_k$ are fixed on the shaft 51 to make rotation axis $P_b$ coincide with the axis of the universal joint $P_j$, load acting on the shaft 51 can be decomposed into radial and axial directions. Load in the axial direction of the shaft 52 can be easily calculated, which was omitted because of little influence in the above embodiment. Alternatively, the axes of universal joints $P_i$ to $P_j$ may be define a polar coordinate.

The machine to be controlled according to the present invention should not be limited to a parallel kinematic mechanism machine with six degrees of freedom in space. The degree of freedom should not be limited to six degrees of freedom, but it may be more than or less than that degree. The universal joint is not limited to one consisting of a combination of joints with one degree of freedom in rotation, but other structured ones such as spherical joint may be used. The present invention may be applied not only to a machine tool with cutters, but to a robot, industrial machine, amusement machine, construction machine, and others.

What is claimed is:

1. A method for controlling a parallel kinematic mechanism machine, wherein the parallel kinematic mechanism machine comprises a base fixed outside, a plurality of struts connected to the base through a first universal joint, an actuator for driving each strut, an end effector connected to each strut through a second universal joint, and a control device for controlling the actuator by giving an actuator command thereto, the method comprising:

a first step of obtaining each actuator command corresponding to position and posture commands of the end effector on the basis of predetermined kinematic parameters in the parallel kinematic mechanism machine;

a second step of obtaining a load exerted by weight of at least any of the struts, actuators, first universal joints, second universal joints, and end effector;

a third step of obtaining a load in the direction of axis of each strut and each actuator from the load obtained at the second step, kinematic parameters, and the position and posture commands of the end effector;

a fourth step of decomposing the loads in the direction of axis of each strut obtained at the third step into each direction of axis of each universal joint defining an axial coordinate that contains the same axis in direction as any of rotation axes of the components of each first universal joint and/or each second universal joint;

a fifth step of obtaining the amount of elastic deformation of at least any of the struts, actuators, or end effector from the loads in the direction of axis of each strut and each actuator obtained at the third step and from compliances of at least any of the strut, actuators, or end effector in each direction, and obtaining each first amount of elastic deformation and/or each second amount of elastic deformation that are amounts of elastic deformation of each first universal joint and/or each second universal joint respectively from compliances in each direction of axis of each universal joint and the loads in the direction of axis of each strut decomposed at the fourth step;

a sixth step of converting each amount of elastic deformation, and each first amount of elastic deformation and/or each second amount of elastic deformation obtained at the fifth step into the direction of axis of each actuator in consideration of angles in the direction of axis of each actuator and each strut, and a seventh step of renewing actuator commands obtained at the first step in consideration of the converted each amount of elastic deformation, and converted each first amount of elastic deformation and/or converted each second amount of elastic deformation obtained respectively at the sixth step.

2. A method for controlling a parallel kinematic mechanism machine according to claim 1, wherein, at the second step, loads exerted by weight of at least any of the struts, actuators, or second universal joints are decomposed into loads in the direction of axis of each strut and loads in the direction perpendicular to the axis of the strut, and then obtained loads in the direction perpendicular to the axis of the strut is added to load acting on the end effector as a moment load around a rotation center of each first universal joint.

3. A method for controlling a parallel kinematic mechanism machine according to claim 1, wherein, at the fourth step, the axis of the first universal joint is fixed on the base, and that of the second universal joint is fixed on the end effector.

4. A method for controlling a parallel kinematic mechanism machine according to claim 2, wherein, at the fourth step, the axis of the first universal joint is fixed on the base, and that of the second universal joint is fixed on the end effector.

5. A method for controlling a parallel kinematic mechanism machine according to claim 1, wherein, at the sixth step, each first amount of elastic deformation and/or each second amount of elastic deformation is/are approximated to the direction of axis of each actuator on the basis of the positional relationship between vector of each first amount of elastic deformation and/or vector of each second amount of elastic deformation along the direction of deformation of each first amount of elastic deformation and/or each second amount of elastic deformation and vector of axis of each actuator along the axis of each actuator.

6. A method for controlling a parallel kinematic mechanism machine according to claim 2, wherein, at the sixth step, each first amount of elastic deformation and/or each second amount of elastic deformation is/are approximated to the direction of axis of each actuator on the basis of the positional relationship between vector of each first amount of elastic deformation and/or vector of each second amount of elastic deformation along the direction of deformation of each first amount of elastic deformation and/or each second amount of elastic deformation and vector of axis of each actuator along the axis of each actuator.

7. A method for controlling a parallel kinematic mechanism machine according to claim 3, wherein, at the sixth step, each first amount of elastic deformation and/or each second amount of elastic deformation is/are approximated to the direction of axis of each actuator on the basis of the positional relationship between vector of each first amount of elastic deformation and/or vector of each second amount of elastic deformation along the direction of deformation of each first amount of elastic deformation and/or each second amount of elastic deformation and vector of axis of each actuator along the axis of each actuator.

8. A control device for controlling a parallel kinematic mechanism machine by providing actuator commands therewith, wherein the parallel kinematic mechanism machine comprises a base fixed outside, a plurality of struts connected to the base through a first universal joint, actuators for driving each strut, an end effector connected to each strut through a second universal joint, the control device comprising:

an actuator command computing section for obtaining each actuator command corresponding to position and posture commands of the end effector on the basis of predetermined kinematic parameters in the parallel kinematic mechanism machine;

a load computing section for obtaining a load exerted by weight of at least any of the struts, actuators, first universal joints, second universal joints, and end effector;

an axial load computing section for obtaining loads in the direction of axis of each strut and each actuator from the load obtained with the load computing section, kinematic parameters, and the position and posture commands of the end effector;

a decomposing computing section for decomposing loads in the direction of axis of each strut obtained with the axial load computing section into each direction of axis of each universal joint defining an axial coordinate that contains the same axis in direction as any of rotation axes of the components of each first universal joint and/or each second universal joint;

an elastic deformation-amount computing section for obtaining the amount of elastic deformation of at least any of the struts, actuators, or end effector from the loads in the direction of axis of each strut and each actuator obtained with the axial load computing section, and from compliances of at least any of the strut, actuators, or end effector in each direction, and obtaining each first amount of elastic deformation and/or each second amount of elastic deformation that are amounts of elastic deformation of each first universal joint and/or each second universal joint respectively from compliances in each direction of axis of each universal joint and the loads in the direction of axis of each strut decomposed at the decomposing computing section;

a conversion computing section for converting each amount of elastic deformation, and each first amount of elastic deformation and/or each second amount of elastic deformation obtained with the elastic deformation-amount computing section into the direction of axis of each actuator in consideration of angles in the direction of axis of each actuator and each strut, and a renewal computing section for renewing actuator commands obtained with the actuator command computing section in consideration of the converted each amount of elastic deformation, and converted each first amount of elastic deformation and/or converted each second amount of elastic deformation obtained respectively at the conversion computing section.

9. A control device for controlling a parallel kinematic mechanism machine according to claim 8, wherein, at the load computing section, loads exerted by weight of at least any of the struts, actuators, or second universal joints are decomposed into loads in the direction of axis of each strut and loads in the direction perpendicular to the axis of the strut, and then obtained loads in the direction perpendicular to the axis of the strut is added to load acting on the end effector as a moment load around a rotation center of each first universal joint.

10. A control device for controlling a parallel kinematic mechanism machine according to claim 8, wherein, at the decomposing computing section, the axis of the first universal joint is fixed on the base, and that of the second universal joint is fixed on the end effector.

11. A control device for controlling a parallel kinematic mechanism machine according to claim 9, wherein, at the decomposing computing section, the axis of the first universal joint is fixed on the base, and that of the second universal joint is fixed on the end effector.

12. A control device for controlling a parallel kinematic mechanism machine according to claim 8, wherein, at the conversion computing section, each first amount of elastic deformation and/or each second amount of elastic deformation is/are approximated to the direction of axis of each actuator on the basis of the positional relationship between vector of each first amount of elastic deformation and/or vector of each second amount of elastic deformation along the direction of deformation of each first amount of elastic deformation and/or each second amount of elastic deformation and vector of axis of each actuator along the axis of each actuator.

13. A control device for controlling a parallel kinematic mechanism machine according to claim 9, wherein, at the conversion computing section, each first amount of elastic deformation and/or each second amount of elastic deformation is/are approximated to the direction of axis of each actuator on the basis of the positional relationship between vector of each first amount of elastic deformation and/or vector of each second amount of elastic deformation along the direction of deformation of each first amount of elastic deformation and/or each second amount of elastic deformation and vector of axis of each actuator along the axis of each actuator.

14. A control device for controlling a parallel kinematic mechanism machine according to claim 10, wherein, at the conversion computing section, each first amount of elastic deformation and/or each second amount of elastic deformation is/are approximated to the direction of axis of each actuator on the basis of the positional relationship between vector of each first amount of elastic deformation and/or vector of each second amount of elastic deformation along the direction of deformation of each first amount of elastic deformation and/or each second amount of elastic deformation and vector of axis of each actuator along the axis of each actuator.

* * * * *